United States Patent [19]

Glinsmann et al.

[11] 4,330,418
[45] May 18, 1982

[54] CHARACTERIZING HYDROCARBON SULFONATES AND UTILIZATION OF HYDROCARBON SULFONATES IN OIL RECOVERY

[75] Inventors: Gibert R. Glinsmann; James H. Hedges, both of Bartlesville, Okla.

[73] Assignee: Phillips Petroleum Company, Bartlesville, Okla.

[21] Appl. No.: 100,086

[22] Filed: Dec. 4, 1979

[51] Int. Cl.³ .............................................. E21B 43/22
[52] U.S. Cl. ................................ 252/8.55 D; 166/275
[58] Field of Search ................... 252/8.55 D; 166/252, 166/274, 275

[56] References Cited

U.S. PATENT DOCUMENTS

| | | | |
|---|---|---|---|
| 3,467,190 | 9/1969 | Dunlap et al. | 166/252 |
| 3,623,553 | 11/1971 | Burdge | 166/275 |
| 3,885,628 | 5/1975 | Reed et al. | 166/252 |
| 3,981,361 | 9/1976 | Healy | 166/275 X |
| 4,066,124 | 1/1978 | Carlin et al. | 166/252 |
| 4,122,895 | 10/1978 | Sutton et al. | 166/252 |
| 4,125,156 | 11/1978 | Glinsmann | 252/8.55 D X |

Primary Examiner—Herbert B. Guynn

[57] ABSTRACT

A method for determining the average equivalent weight of hydrocarbon sulfonates and the optimal salinity and unique salinity of surfactant systems containing such hydrocarbon sulfonates is based on the discovery that the average equivalent weights of hydrocarbon sulfonates vary inversely and linearly as the optimal salinities and unique salinities of surfactant systems containing such hydrocarbon sulfonates vary. Methods of preparing surfactant systems for the displacement of oil from subterranean reservoirs and for the displacement of oil from subterranean reservoirs, based on the above-mentioned relationships, are also disclosed.

34 Claims, 7 Drawing Figures

CHARACTERIZING HYDROCARBON SULFONATES AND UTILIZATION OF HYDROCARBON SULFONATES IN OIL RECOVERY

BACKGROUND OF THE INVENTION

In the art of recovering oil from subterranean reservoirs it is known that substantial volumes of oil are left in the reservoir after all effective primary production techniques have been utilized. In order to recover additional oil from reservoirs which have been depleted by primary production techniques, it is necessary to resort to secondary recovery techniques, which generally involve driving the oil from the reservoir with one or more fluids. For example, the continuous injection of water, gases such as natural gas, air, carbon dioxide, etc. or, in order to reduce the volume of expensive driving fluids, introducing a slug of a fluid such as propane, a surfactant solution, etc. followed by a drive fluid such as water, natural gas or air. Certain of these techniques may be carried out under conditions such that at least the fluid in contact with the reservoir oil is miscible with the oil and preferably, in the case of a slug-type process, the slug is also miscible with the ultimate driving fluid. Miscible displacement is advantageous to the extent that, at least theoretically, 100 percent of the oil is displaced by the miscible fluid in the area contacted by the miscible fluid, which displacement efficiency is substantially above that obtained when a fluid immiscible with the oil is used. However, the maintence of miscibility throughout the drive from injection wells to production wells is difficult at best and in some cases impossible. Another problem in both miscible and immiscible drives which utilize gas as either the sole driving fluid or the ultimate driving fluid in a slug-type process is that unfavorable mobility ratios exist in the reservoir. Specifically, the more highly mobile gas tends to channel through the reservoir thereby sweeping only a very limited area of the reservoir and/or breaking through a slug material and thereby partially or completely eliminating the advantages of the high displacement efficiency of the slug. Of the above mentioned techniques the use of a slug of a surfactant solution has a number of advantages. First of all the surfactant reduces the interfacial tension in the reservoir, thus substantially improving displacement of the oil. Secondly, since the slug of surfactant solution is a liquid and can be driven by water, the disadvantages of unfavorable mobility ratios are eliminated or substantially reduced. Finally, surfactant recovery techniques can be utilized in reservoirs which have already been subjected to secondary recovery techniques, particularly where the reservoir has been produced to its economic limits by water flooding. In the last instance the surfactant technique is referred to as a tertiary oil recovery technique.

A wide variety of surfactant oil recovery techniques have heretofore been proposed. For example, the surfactants may be used in both systems forming microemulsions and in systems which do not form microemulsions. The surfactant system may also be utilized under conditions such that displacement of the oil is under either miscible or immiscible conditions. As indicated previously, miscible displacement in general is at least theoretically highly desirable but has the inherent difficulties of maintaining miscible displacement throughout the reservoir and a miscible surfactant drive presents problems of maintaining interfacial tension sufficiently low to provide immiscible displacement after miscibility has been lost. One technique which has received increasing attention in recent years is the utilization of a microemulsion under immiscible conditions. This technique can be practiced either by forming a multiphase microemulsion system comprising a water phase, a microemulsion phase, and an oil phase at the surface of the earth by mixing oil, brine and surfactant and thereafter injecting at least the immiscible microemulsion phase into the reservoir. However, this technique requires substantial amounts of oil, thereby increasing operating costs, and to the extent an oil other than the reservoir oil is utilized, problems occur due to differing phase behaviors of different oils. It has also been proposed to prepare a surfactant system including water, an electrolyte, at least one surfactant and optionally a cosurfactant at the surface of the earth, inject the surfactant system into the reservoir and thereby form the immiscible microemulsion in situ in the reservoir. It is preferable in such cases to prepare a surfactant system capable of forming the previously mentioned multiphase system of water, microemulsion and oil. It is also preferred, in practicing this technique, to employ synthetic or petroleum hydrocarbon sulfonates as a surfactant due to their availability and for economic reasons. One of the most important factors in the utilization of hydrocarbon sulfonates in surfactant systems designed to form an immiscible, microemulsion in situ in a reservoir is a knowledge of the average equivalent weight of the sulfonate. While the average equivalent weight of a number of commercially available sulfonates have been established, this is not the case with all commercially available materials and, in addition, it is often necessary to tailor the sulfonate for use in a particular oil recovery process, since the particular sulfonate which would be most effective may not be commercially available.

Obviously, knowledge of the average equivalent weight of hydrocarbon sulfonates is also highly desirable where such sulfonates are to be utilized for other purposes, such as detergents, etc.

Characterization of petroleum sulfonates by the average equivalent weight method described in ASTM Procedure D-855-56 is usable only for sodium sulfonates and is a time consuming procedure. Further, analytical characterization methods, based on anionic surfactant dye complexes, are also subject to various problems due to impurities in the dye, salt effects and the interference of unreacted oil in the sulfonate.

In light of the above it is highly desirable to provide a fast reproducible and accurate technique for determining the average equivalent weight of hydrocarbon sulfonates and to be able to utilize knowledge of the average equivalent weight of such sulfonates in the recovery of oil from subterranean reservoirs.

It is therefore an object of the present invention to provide a fast accurate and reproducible technique for characterizing hydrocarbon sulfonates.

Another object of the present invention is to provide a fast accurate and reproducible technique for characterizing hydrocarbon sulfonates for use in the displacement of oil from a subterranean reservoir.

A further object of the present invention is to provide a fast accurate and reproducible technique for determining the average equivalent weights of hydrocarbon sulfonates of unknown average equivalent weight.

Yet another object of the present invention is to provide an effective fast and accurate technique for determining the average equivalent weight of hydrocarbon sulfonates which permit one to produce sulfonates tailored to be most effective in oil recovery processes.

Another and further object of the present invention is to provide an improved technique for the preparation of a surfactant system including at least one hydrocarbon sulfonate for the displacement of oil from a subterranean reservoir.

A still further object of the present invention is to provide an improved technique for the displacement of oil from a subterranean reservoir by the injection of a surfactant system containing at least one hydrocarbon sulfonate.

These and other objects and advantages of the present invention will be apparent from the following description.

SUMMARY OF THE INVENTION

In accordance with the present invention it has been discovered that the average equivalent weights of hydrocarbon sulfonates vary inversely and linearly as the optimal salinity or the unique salinity of surfactant systems containing such sulfonates vary. Consequently, by establishing either the optimal salinity or the unique salinity of at least one surfactant system containing a hydrocarbon sulfonate of known average equivalent weight, an average equivalent weight can be assigned to petroleum sulfonates of unknown average equivalent weight based on the above mentioned relationship. Conversely by establishing the average equivalent weight of a hydrocarbon sulfonate contained in a surfactant system having a known optimal salinity or a known unique salinity, an optimal salinity or a unique salinity may be assigned to different surfactant systems of unknown optimal salinity or unknown unique salinity, respectively, by utilizing the above mentioned relationship. Based on the above relationship the present invention also provides an improved technique for preparing a surfactant system for the displacement of oil from a subterranean reservoir and an improved technique for the displacement of oil from the subterranean reservoir.

DESCRIPTION OF THE PREFERRED EMBODIMENTS

Figure 2:
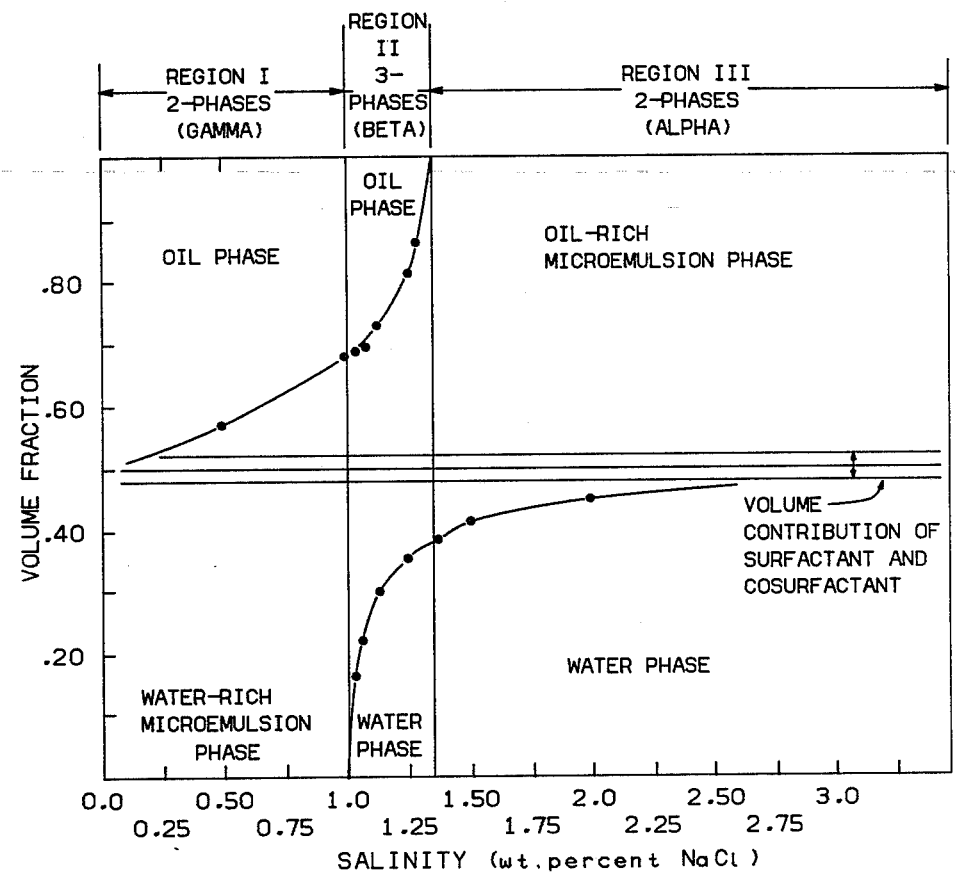
FIG. 2 is a phase-volume diagram of a series of equilibrated mixtures such as that of FIG. 1.

The present invention is intimately related to and most useful in the recovery of oil from subterranean reservoirs in which a surfactant system including water, an electrolyte, a hydrocarbon sulfonate and, optionally, a cosurfactant is prepared at the surface of the earth and injected into the reservoir to form a three-phase microemulsion system in the reservoir. As is pointed out in U.S. Pat. No. 4,125,156, issued to Gilbert R. Glinsmann on Nov. 14, 1978, a three-phase microemulsion region (hereafter referred to as a beta-type region) separates two two-phase regions at salinities higher and lower than those of the three-phase region. These two two-phase regions are referred to as alpha-type and gamma-type regions, respectively. This phase behavior is shown in FIG. 2. Said patent further points out that, for a particular oil, a particular surfactant, a particular co-surfactant, fixed concentrations thereof and at a fixed temperature, there is an optimum or optimal salinity within the three-phase region which will be most effective in displacing oil from a reservoir containing a particular oil. The subject patent sets forth a simple procedure which can be carried out in the laboratory to establish the said optimal salinity. In contrast to the behavior shown in FIG. 2, some systems will exhibit behavior wherein the middle phase rather than the upper phase will diminish in volume in the beta to alpha transition region. This in general does not interfere with the optimal salinity determination.

In conducting laboratory studies of the phase relationships of reservoir oils with surfactant systems it is possible to use either the oil itself or pure hydrocarbons or mixtures thereof. It has heretofore been established that, even through reservoir oils comprise complex mixtures of hydrocarbons whose exact constituents have not been completely defined, such oils mimic simple, pure hydrocarbons or mixtures thereof so far as their phase relationships with surfactant systems are concerned. For example, reservoir oils generally exhibit the same phase relationships with a given surfactant system as certain pure alkane hydrocarbons, alkylbenzenes and alkyl cyclohexanes. Accordingly, by determining, in parallel equilibration tests, the pure hydrocarbon which exhibits the same phase relationship with a given surfactant system as the reservoir oil, of interest, an "equivalent alkane carbon number" (EACN) can be assigned to the oil which is the same as the "alkane carbon number" (ACN) of the pure hydrocarbon. Useful hydrocarbons are alkane hydrocarbons, having about 5 to 20 carbon atoms per molcule (ACN of 5 to 20), alkylbenzenes, for which the ACN equals the number of carbon atoms in the alkyl substituent, or alkyl cyclohexanes, where the ACN is equal to the number of carbon atoms in the alkyl substituent plus 4 for the cyclohexane group. The pure hydrocarbon can be utilized in all phase relation tests to obtain the same phase relationship data as if the oil itself had been used. While relative data, which is accurate, can be obtained by "oil" displacement from porous media utilizing pure hydrocarbons as the oil, prediction of actual performance in the reservoir is best obtained utilizing a sample of the crude itself or a "simulated" crude, since the oil in the reservoir is usually under pressure and contains a certain amount of gas in solution. Even though samples of oil in their natural reservoir state can be recovered and utilized in laboratory displacement studies, the procedures for accomplishing this are tedious. Therefore, it is most convenient to utilize simulated oils comprising a sample of the oil itself reconstituted to exhibit the proper gas saturation or an appropriate pure hydrocarbon modified to exhibit the desired gas saturation.

Specifically, in accordance with said U.S. Pat. No. 4,125,156, a particular reservoir oil or, preferably, a pure hydrocarbon, such as a normal alkane or alkyl benzene, is equilibrated with a series of samples of a surfactant system, comprising water, a particular surfactant and a particular cosurfactant, all in specific proportions, and differing only in the salinity of each sample of surfactant system. The hydrocarbon utilized is preferably a pure hydrocarbon having alkane or alkyl chains of 6 to 16 carbon atoms. The surfactant may be any synthetic or petroleum hydrocarbon sulfonate, preferably with an average equivalent weight in the range of about 350 to 500. The cosurfactant may have a water solubility from slight to infinity but, preferably, has an intermediate solubility of about 0.05 to 15 grams per 100 grams of water at 20° C. The concentration of the surfactant is preferably between about 1 to 7 weight percent active sulfonate based on the weight of the surfactant solution. The cosurfactant to surfactant ratio is preferably in the range of about 0.25 to 1 to 1.5 to 1. As a matter of convenience, for reasons pointed out hereinafter, the oil and surfactant system are equilibrated in a 1 to 1 volume ratio.

EXAMPLE I

Figure 1:
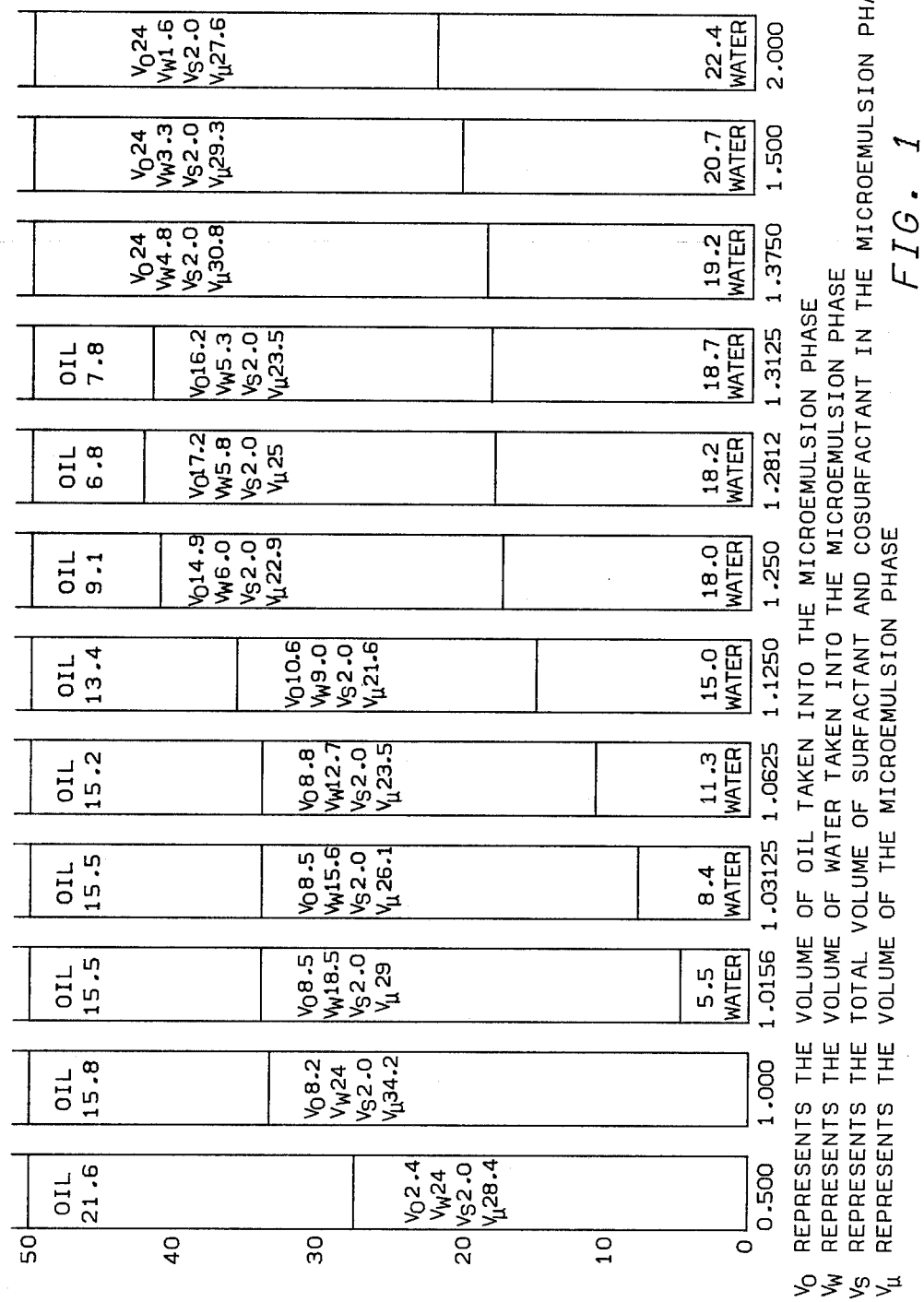
FIG. 1 is a schematic representation of a series of equilibrated mixtures of oil and surfactant systems.

By way of specific example, 12 surfactant systems comprising 94 percent by weight of brine, 3 percent by weight active sodium petroleum sulfonate, having an average equivalent weight of 418, as a surfactant, and 3 percent by weight of isobutyl alcohol, as a cosurfactant, were prepared. Twenty-five milliliters of each of these samples were equilibrated with 25 milliliters of n-decane. The equilibrations were carried out in 50 milliliter, glass-stoppered graduated cylinders which were shaken and then incubated in a temperature bath at 86° F. (30° C.) until volumetric readings remained constant with time (72 hour periods). FIG. 1 of the drawings graphically depicts the graduated cylinders with the volumes of the particular phases formed at each of the salinities utilized. In FIG. 1 the salinities of the surfactant systems utilized is expressed as weight percent sodium chloride, $V_o$ represents the volume of oil taken into the microemulsion phase, $V_w$ represents the volume of water taken into the microemulsion phase, $V_s$ represents the total volume of surfactant and cosurfactant in the microemulsion phase and V represents the total volume of the microemulsion phase.

Figure 3:
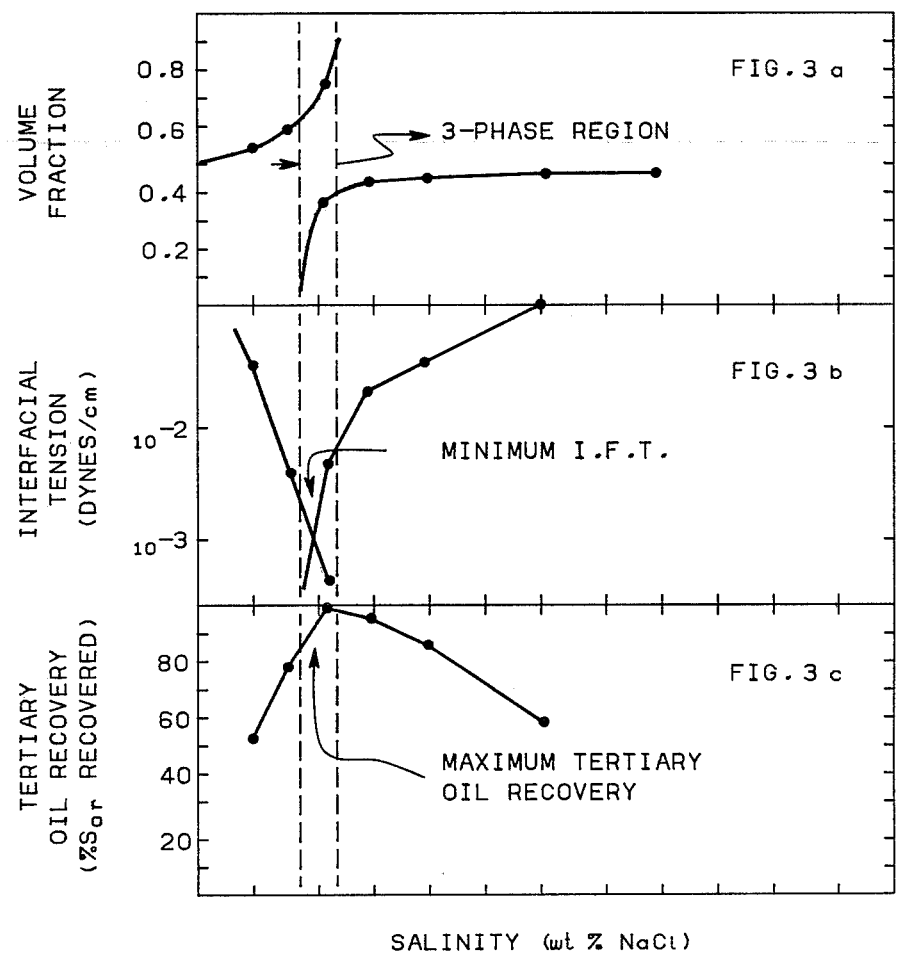
FIG. 3 is a series of diagrams showing the relationship of interfacial tension behavior and tertiary oil recovery to a phase-volume diagram such as that of FIG. 2 for the same oil and surfactant systems.

FIG. 2 of the drawings is a phase volume diagram based on the results illustrated in FIG. 1 and plots the volume fraction of each phase versus salinity of the surfactant systems expressed as weight percent sodium chloride. Finally, FIG. 3 illustrates the relationship of a simplified version of the phase-volume diagram of FIG. 2, the interfacial tension and the recovery of oil from a porous media containing residual n-decane after water flooding, all plotted against salinity for a series of surfactant systems of differing salinity. It is to be observed from FIGS. 3b and 3c that maximum tertiary oil recovery and minimum interfacial tension essentially coincide at a salinity within the three phase region corresponding to the three phase region of FIG. 3a. These points are also essentially coincident with a point within the three phase region of FIG. 3a at essentially the same salinity and where the volume of oil taken up in the microemulsion is equal to the volume of water taken up in the microemulsion or, alternatively, where the volume of water below the microemulsion phase is equal to the volume of oil above the microemulsion phase in the three phase region. The latter are best illustrated by reference to FIGS. 1 and 2. As seen in FIG. 1 the salinity represented by maximum tertiary oil recovery and minimum interfacial tension of FIG. 3 is somewhere between salinities of 1.0625 and 1.1250 weight percent sodium chloride. Between these two salinities as illustrated in Graphs 5 and 6 of FIG. 1 the volume of oil and volume of water in the multiphase middle region are essentially equal or, alternatively, the volume of oil above and the volume of water below the microemulsion phase are essentially equal. The latter makes it obvious why it is preferred that equal volumes of oil and surfactant system be utilized in this procedure. Specifically, the salinity referred to as producing maximum tertiary oil recovery can be observed simply by observing that graduated cylinder in which the volume of water below the microemulsion phase and the volume of oil above the microemulsion phase are essentially equal. FIG. 2 illustrates essentially the same relationship. The particular salinity referred to exhibits a volume of oil above the top function and a volume of water below the bottom function which are equal and essentially equal volumes of water and oil are present in the microemulsion phase of the three phase region. Accordingly, the particular salinity of the surfactant system at which the volume of oil taken up in the microemulsion phase and the volume of water taken up in the microemulsion phase are approximately equal is referred to as the optimum or optimal salinity for the particular oil involved and the particular surfactant system involved, including water, a specified surfactant, a specified cosurfactant, specific concentrations of surfactant and cosurfactant and at a particular temperature.

In accordance with one aspect of the present invention, it has been discovered that the average equivalent weights of hydrocarbon sulfonates, particularly petroleum sulfonates, vary inversely and linearly as the above-mentioned optimal salinities vary. Conversely, the above mentioned optimal salinities vary inversely and linearly as the average equivalent weights of hydrocarbon sulfonates vary. This is illustrated by the following example.

EXAMPLE II

Figure 4:
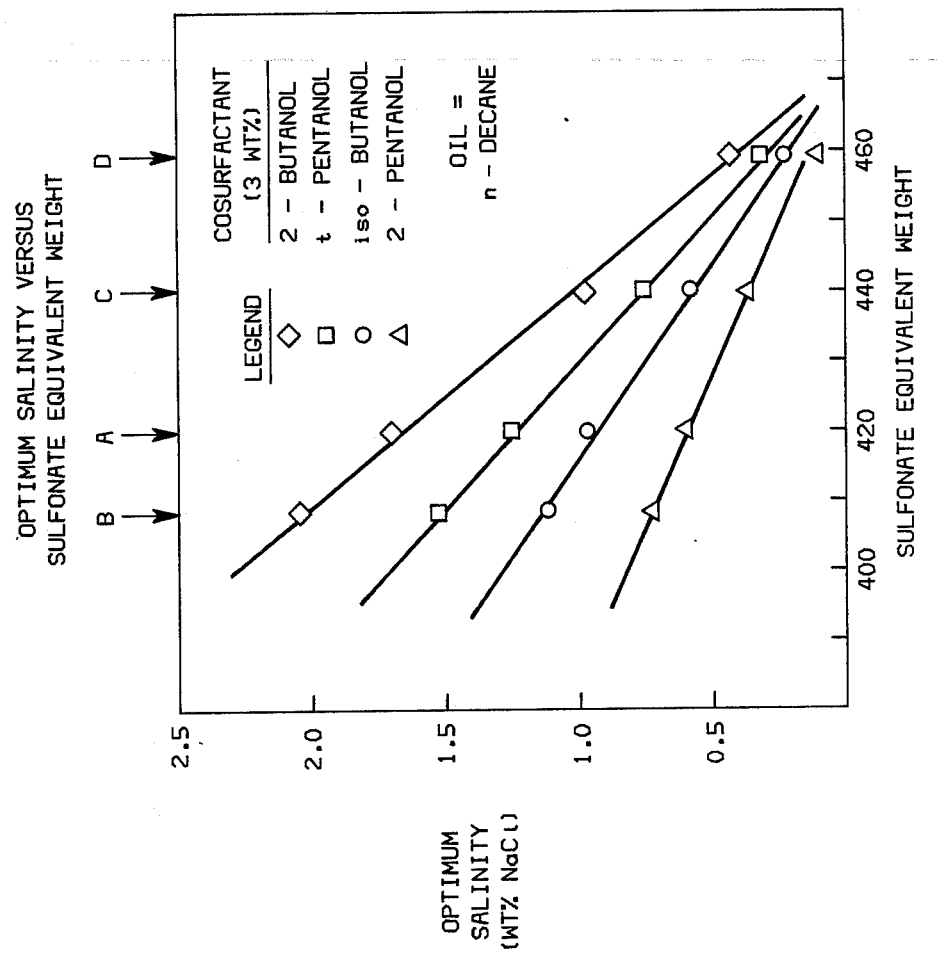
FIG. 4 is a plot of optimal salinity versus sulfonate equivalent weight for a particular oil and different co-surfactants.

In accordance with this series of tests, aqueous surfactant systems containing 3 percent isobutanol as a cosurfactant, 0.2 percent sodium tripolyphosphate, 0.1 percent sodium carbonate and 3 percent active sulfonate of a series of different sodium petroleum sulfonates of differing known average equivalent weights were prepared. Each of these surfactant systems were equilibrated at 30° C. with equal volumes of n-decane. The optimum salinity for each petroleum sulfonate of known average equivalent weight was then determined as previously outlined. FIG. 4 of the drawings illustrates the inverse, linear relationship, between average equivalent weight and optimal salinity previously mentioned, when the known average equivalent weight of the sulfonates are plotted against optimal salinities expressed as weight percent sodium chloride. (See next to the bottom function of FIG. 4). If such a series of tests is then repeated for different cosurfactants having differing water solubilities and the determined optimal salinities are plotted against sulfonate equivalent weight for the same series of sulfonates similar linear functions, as illustrated by the remaining functions of FIG. 4 for 2-butanol, t-pentanol and 2-pentanol are obtained. The differences resulting from the use of cosurfactants of differing water solubility and the significance thereof will be discussed hereinafter. In any event, for each cosurfactant there is a linear, inverse relationship between optimal salinity and average equivalent weight of the surfactant and this function differs among the different cosurfactants only by the slope of the function. Table I below sets forth the data pertinent to this example and that plotted in FIG. 4.

TABLE I

| Sulfonate | Sulfonate Equivalent Weight | Optimal Salinities | | | |
|---|---|---|---|---|---|
| | | 2-butanol | t-pentanol | isobutanol | 2-pentanol |
| A | 407 | 2.04 | 1.53 | 1.10 | 0.71 |
| B | 420 | 1.70 | 1.25 | 0.95 | 0.58 |
| C | 440 | 0.97 | 0.73 | 0.56 | 0.33 |
| D | 460 | 0.42 | 0.29 | 0.20 | — |

EXAMPLE III

In this example another group of tests were run in exactly the same way as the tests described in the next previous example. Each series of tests utilized the same surfactants utilized in the previous example and a series of runs were made for utilizing each of 2-butanol, iso-butanol, n-butanol, 2-pentanol and iso-pentanol. In all cases the surfactant systems were equilibrated with equal volumes of a different "oil" represented by n-hexadecane. The n-hexadecane has an alkane carbon number of 16 and therefore represents an oil of high alkane carbon number as opposed to the low alkane carbon number of n-decane. The results of this series of tests is set forth in Table II below and is illustrated by FIG. 5 which is plotted in the same manner as FIG. 4.

TABLE 2

| Sulfonate | Sulfonate Equivalent Weight | Optimal Salinities | | | | | |
|---|---|---|---|---|---|---|---|
| | | 2-butanol | t-pentanol | isobutanol | n-butanol | 2-pentanol | isopentanol |
| A | 407 | — | — | — | 2.6 | 1.80 | 0.58 |
| B | 420 | 3.40 | — | 2.25 | 2.04 | 1.40 | 0.50 |
| C | 440 | 2.32 | — | 1.52 | 1.38 | 0.93 | 0.30 |
| D | 460 | 1.20 | 0.95 | 0.78 | 0.70 | 0.48 | 0.09 |

Figure 5:
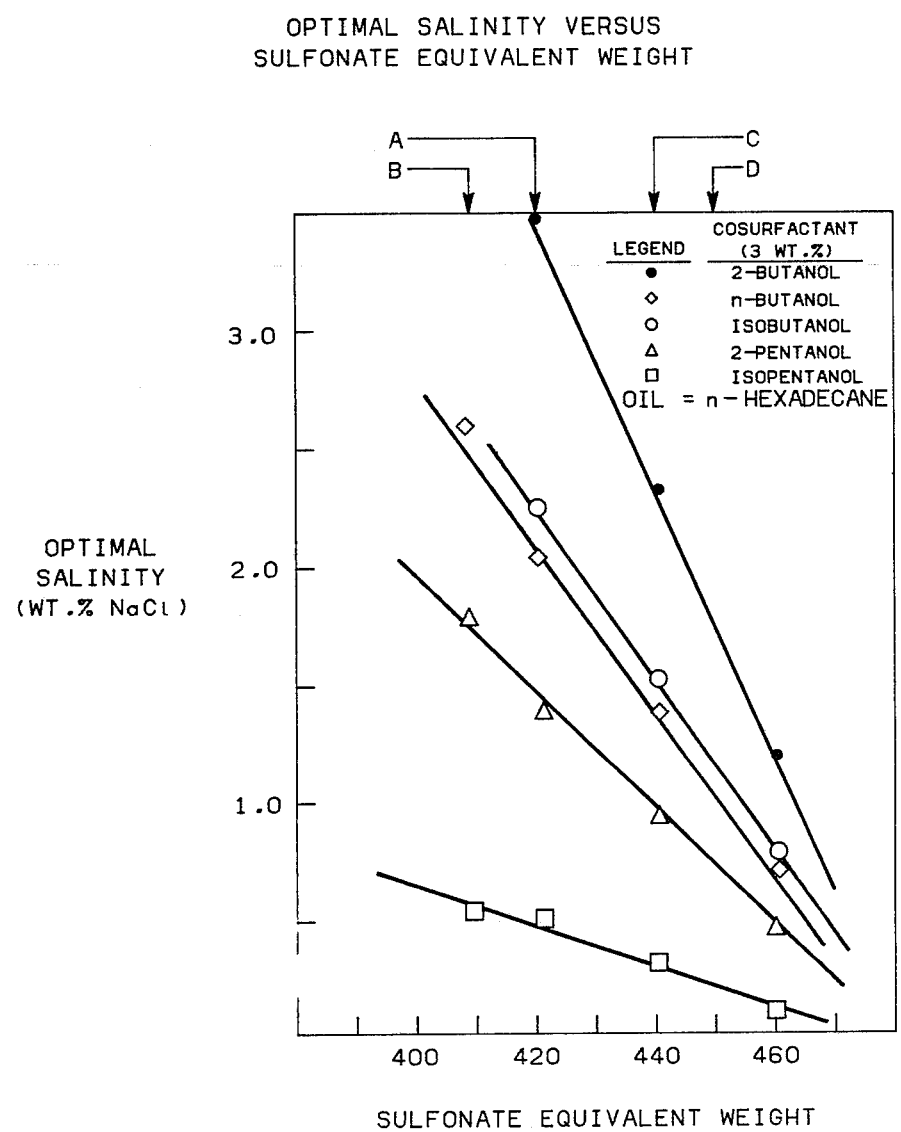
FIG. 5 is a plot similar to FIG. 4 for a different oil.

It is to be observed that FIG. 5 shows that for each cosurfactant there is a linear, inverse relationship between optimal salinity and average equivalent weight of the surfactant and that this function differs among the different cosurfactants only in the slope of the function. In addition, by comparing FIG. 4 and FIG. 5 it is to be seen that the character of the linear functions are the same but the functions for the oil having the higher alkane carbon number are steeper than those for the lower alkane carbon number oil. This of course results from the fact that the optimal salinities differ for the different oils.

Therefore, in accordance with one aspect of the present invention, the linear, inverse relationship between optimal salinity and average equivalent weight of a sulfonate surfactant can be utilized to determine the average equivalent weights of sulfonates of unknown equivalent weight or, conversely, the optimal salinities of surfactant systems of unknown optimal salinity containing such sulfonates. The basic functions can be established by determining the optimal salinities for at least two sulfonates of known average equivalent weight or, conversely, by determining the average equivalent weight of two surfactant systems of known optimal salinity. If two optimal salinities are determined for two sulfonates of known average equivalent weight, it would obviously be preferable to utilize sulfonates having an average equivalent weight near the lower and upper ends of the range of about 300 to 500. If the average equivalent weights of two sulfonates are determined for two surfactant systems of known optimal salinity, it is preferred that they be at the lower and upper end, respectively, of the range 0 to 3.5 weight percent NaCl. Once a function has been established for a particular oil and a particular cosurfactant it is not necessary to repeat this procedure and the assignment of an average equivalent weight to a particular sulfonate of unknown average equivalent weight or of an optimal salinity to a surfactant system of unknown optimal salinity is greatly simplified and can be carried out in a number of ways. The most obvious and simple procedure would be to prepare a plot or plots such as those illustrated in FIGS. 4 and 5 of the drawings. Thereafter the average equivalent weight of a sulfonate of unknown average equivalent weight can be determined by establishing the optimal salinity of the surfactant system containing the sulfonate of unknown average equivalent weight from previous data or by equilibration test and reading the value of the sulfonate average equivalent weight from the function of the plot. Similarly an unknown optimal salinity of a surfactant system can be determined by establishing the average equivalent weight of the sulfonate contained in the surfactant system of unknown optimal salinity, either from previous data or by equilibration tests, and thereafter reading the optimal salinity for the surfactant system of unknown optimal salinity from the function of the plot. It is also possible to determine the average equivalent weight of a sulfonate of unknown average equivalent weight by establishing the optimal salinity of a surfactant system containing the sulfonate of unknown average equivalent weight and intercalation between the two previously known values. By the same token, by establishing the average equivalent weight of the petroleum sulfonate contained in a surfactant system of unknown optimum salinity the optimum salinity of a surfactant system of unknown optimum salinity can be obtained by intercalation between two known values. Obviously this latter procedure is greatly simplified if the unknown value is midway between the two known values and thus a simple averaging procedure can be utilized.

For example, if the optimal salinity for a surfactant with an average equivalent weight of 420 was 3.5 and the optimal salinity for a surfactant having an average equivalent weight of 460 was 1.0 and it was established that the optimal salinity for a surfactant system containing the surfactant of unknown average equivalent weight was 2.25, then the unknown average equivalent weight would be the average of 420 and 460 or 440. Conversely, knowing that the optimal salinity for a surfactant system containing a sulfonate having an average equivalent weight of 420 was 3.5 and the optimal salinity for a sulfonate having an average equivalent weight of 460 was 1.0 and establishing that the average equivalent weight of a sulfonate contained in a surfactant system of unknown optimal salinity was 440, then the optimal salinity for the surfactant system of unknown optimal salinity would be 2.25.

While a surfactant system having an optimal salinity, as previously discussed, theoretically results in maximum oil displacement it has been found in accordance with copending application Ser. No. 71,642, filed Aug. 31, 1979 now U.S. Pat. No. 4,265,308, which is incorporated herein by reference, that the optimal salinity determined for a given case does not necessarily result in maximum oil displacement in all cases. The exceptions occur in instances where a cosurfactant is present in the surfactant system utilized and, as pointed out in said application, for a given oil and for each particular surfactant there is an optimal salinity at which maximum oil displacement is attained in actual displacement tests in porous media. This optimal salinity at which maximum oil displacement occurs is referred to in said application as the "unique" salinity. For example, if oil is displaced from a porous media by a series of different surfactant systems containing the same surfactant but cosurfactants of different water solubility there is a particular combination of the surfactant and cosurfactant corresponding to maximum oil displacement from a porous media and hence at which the unique salinity occurs. It is theorized that the unique salinity occurs when the deleterious effects of surfactant retention by the porous media and dilution of cosurfactant during displacement from the porous media are cooperatively minimized.

EXAMPLE IV

The unique salinity for a particular combination of oil and a particular surfactant is determined in accordance with the copending application by what may be termed a cosurfactant water solubility scan or specifically an alcohol scan. In such a procedure, optimum salinities are determined, as previously discussed, for the particular oil of interest, a particular surfactant and each of a series of cosurfactants of various water solubilities, for example from slight to infinity. In a specific example set forth in said copending application, the following alcohols were utilized:

| Alcohols | Water Solubility |
| --- | --- |
| Isopentanol | 2 grams per hundred grams |
| 2-Pentanol | 4 grams per hundred grams |
| n-Butanol | 9 grams per hundred grams |
| Isobutanol | 10 grams per hundred grams |
| t-Pentanol | |
| 2-Butanol | 12.5 grams per hundred grams |
| Isopropanol | Infinite |

The surfactant utilized was a commercially available sodium petroleum sulfonate having the average equivalent weight of 420 (previous sulfonate having the average equivalent weight of 420 (previous sulfonate B) and the oil was n-decane. Optimum salinities were obtained for the n-decane, the petroleum sulfonate and each of the subject alcohols. Thereafter, the n-decane was displaced from a laboratory core with each of the previously mentioned surfactant systems at their determined optimal salinities. All oil displacement tests were conducted in a Berea sandstone core 3 feet in length and 3 inches in diameter. Prior to the surfactant flood, each core was saturated with optimum salinity brine, oil flooded to irreducible water saturation and water flooded with optimal salinity brine to irreducible oil saturation. The displacement fluid sequence comprised a preslug of 0.60 pore volume of 0.2 percent sodium tripolyphosphate and 0.1 percent sodium carbonate prepared in a corresponding optimal salinity brine, a surfactant slug of 0.10 pore volume containing 3 percent active petroleum sulfonate, 3 percent of the indicated cosurfactant, 0.2 percent sodium phosphate and 0.1 percent sodium carbonate prepared in a corresponding optimum salinity brine and a mobility buffer of 0.5 percent pore volume of a high viscosity polymer solution prepared in a corresponding optimum salinity brine and having an adjusted concentration of polymer to yield an initial viscosity of about 40 centipoise. The sodium tripolyphosphate and sodium carbonate were added to the preflush and surfactant slugs to reduce adsorption of sulfonate in the core or in essence as sacrificial agents.

Figure 6:
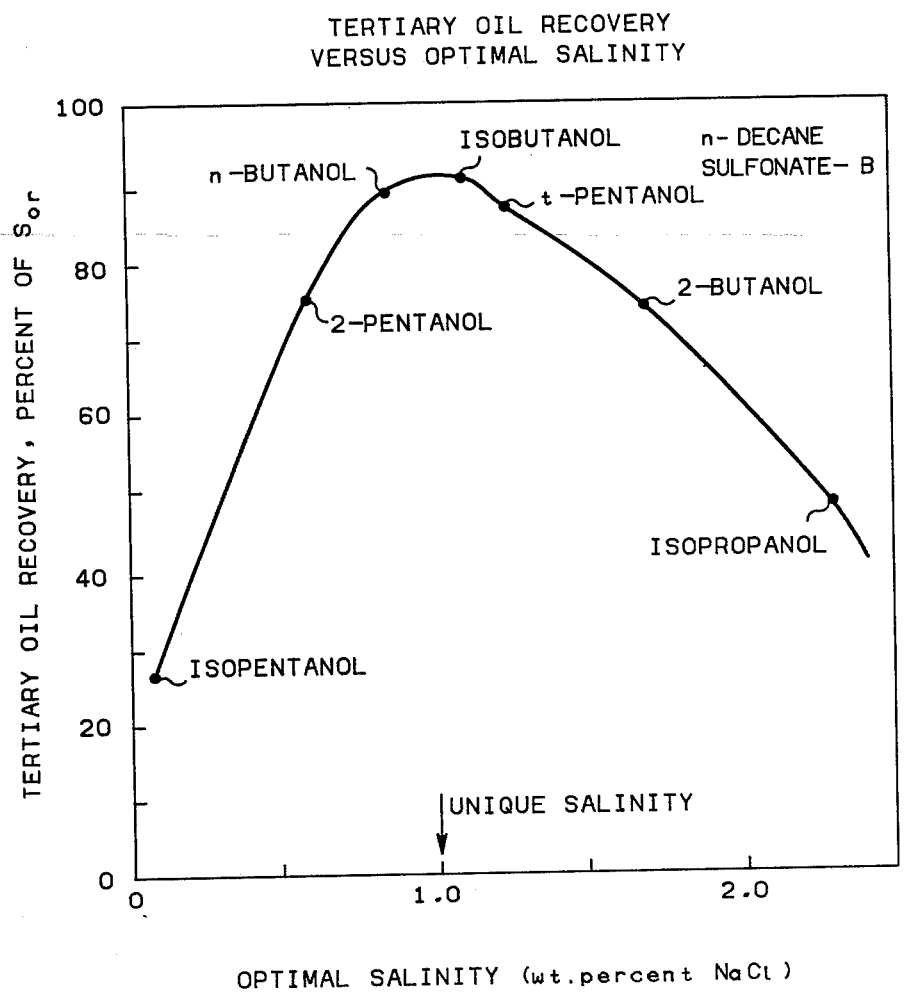
FIG. 6 is a plot of tertiary oil recovery versus optimal salinities for a particular oil and various cosurfactants.

FIG. 6 of the drawings illustrates the results of this series of displacements wherein tertiary oil recovery, expressed as percent of residual waterflood oil (Sor) is plotted versus optimal salinity for each system tested. It is to be observed from FIG. 6 that there is a particular optimum salinity or unique salinity at about 1.0 weight percent sodium chloride at which maximum displacement of oil from the porous media was attained. This unique salinity occurs at a particular water solubility between that of n-butanol and isobutanol.

Without going into detail a similar series of tests were conducted with another oil having a high alkane carbon number, namely n-hexadecane. The same basic relationship shown in FIG. 6 was obtained, except that the unique salinity corresponds to the use of a cosurfactant having a different water solubility than that shown for n-decane and the same surfactant.

EXAMPLE V

Figure 7:
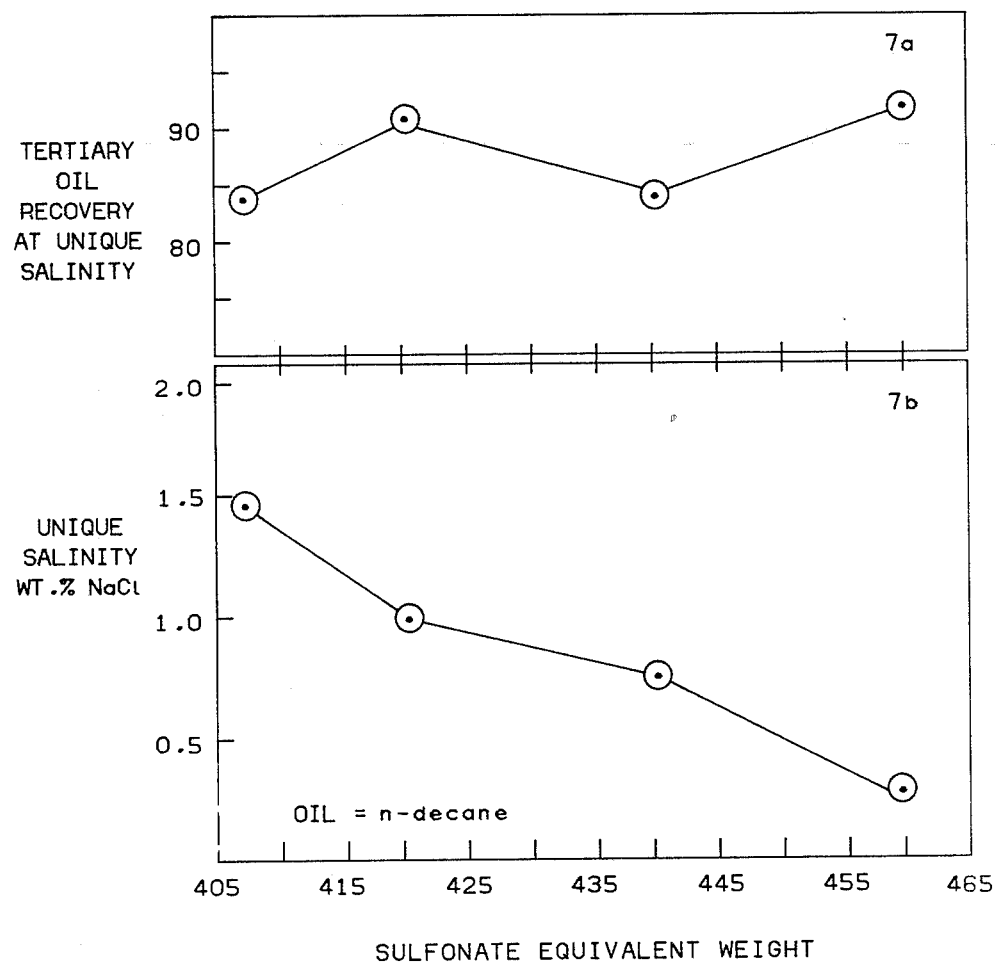
FIG. 7 is a series of plots showing the relationship of tertiary oil recovery and unique salinity to sulfonate equivalent weight.

If the unique salinity is obtained for a series of surfactants of different average equivalent weights (by way of specific example, A-407, B-420, C-440 and D-460) in the same manner discussed in the previous example, the relationships between tertiary oil recovery at the unique salinities and the unique salinities versus sulfonate equivalent weight can be shown as illustrated in FIG. 7 of the drawings. FIG. 7 shows a plot (7a) of tertiary oil recovery (Sor) at unique salinity versus sulfonate equivalent weight and 7b unique salinity versus sulfonate equivalent weight. It is to be observed from FIG. 7a that consistently high tertiary oil recoveries are obtained at the unique salinity for all of the sulfonates tested, specifically above about 85 percent recovery. FIG. 7b shows that, with the exception of a slight anomaly for the sulfonate having an average equivalent weight of 420 there is an inverse, linear relationship between unique salinity and the average equivalent weight of the surfactant. The relationships shown in FIG. 7 were found to be essentially independent of the type of cosurfactant (unique salinity and maximum oil recovery occurring at essentially the same cosurfactant solubility for the particular oil) and irrespective of cosurfactant concentration. Consequently, in accordance with another aspect of the present invention, the linear relationship between unique salinity and sulfonate average equivalent weight can be utilized in the same manner as previously discussed with respect to the linear relationship between optimal salinity and surfactant average equivalent weight. More specifically, an average equivalent weight can be assigned to a surfactant of unknown average equivalent weight based on a knowledge of the unique salinity for a surfactant system containing the surfactant of unknown average equivalent weight and the unique salinity of at least one second surfactant system and the average equivalent weight of the surfactant contained in the second surfactant system. Conversely, the unique salinity of a surfactant system of unknown unique salinity can be determined from a knowledge of the average equivalent weight of the surfactant contained in the surfactant system of unknown unique salinity and the unique salinity of at least one second surfactant system containing a surfactant of known average equivalent weight.

The linear relationship between unique salinity and surfactant average equivalent weight is particularly useful in the design and utilization of surfactant systems for oil displacement. This relationship permits one to tailor a surfactant for use in a surfactant system as well as tailor a surfactant system for the particular reservoir in which it is to be utilized. More specifically, it is to be observed that a range of unique salinities which result in maximum oil recovery can be utilized to displace the particular oil in question simply by adjusting the average equivalent weight of the surfactant to be utilized. Therefore, a particular surfactant average equivalent weight can be selected which will result in maximum oil recovery at a preselected salinity which can be selected to be the same as or close to the salinity of the connate water in the reservoir of interest.

As a general rule, it has been found that petroleum sulfonates having an average equivalent weight between about 375 and 500 are most effective.

Having determined the best sulfonate, such sulfonate can then be prepared by adjusting the average equivalent weight of the sulfonate previously characterized above or below the average equivalent weight (EAEW) previously determined. One method of adjusting the EAEW of the sulfonate would be to blend several sulfonates. As a practical matter, it has been determined that any desired sulfonate can be produced by blending about three basic sulfonates. Another method would be to vary the feed materials and/or conditions of operation in the manufacture of the sulfonate.

The sulfonates referred to herein comprise preferably synthetic or petroleum sulfonates. For use in immiscible phase oil-displacement a sulfonate will have an average equivalent weight within the range of about 375 to about 500. These sulfonates may be a complex mixture of components including aryl sulfonates, alkaryl sulfonates with the mixture consisting mostly of monosulfonates having one —SO$_3$Na (or —K or —NH$_4$) group per molecule. These individual hydrocarbon sulfonates, for example, can include the following compounds: the ammonia, sodium, or potassium dodecyl sulfonates (C$_{18}$H$_{29}$SO$_3$M); alkane sulfonates such as octadecane sulfonate (C$_{18}$H$_{29}$SO$_3$M); and phenylalkane sulfonates such as phenyldodecane sulfonate (C$_{18}$H$_{29}$SO$_3$M). As used herein the term "equivalent weight" is used in the usual manner. In the case of pure monosulfonates, the equivalent weight equals the molecular weight, whereas the equivalent weight of a disulfonate is equal to one-half of the molecular weight. The equivalent weights referred to are, as noted, average equivalent weights and there may be present significant amounts of sulfonates having equivalent weights as low as 200 and as high as 650.

The sulfonates can be manufactured by sulfonating an appropriate hydrocarbon feed to form a sulfonic acid, i.e., a compound containing the —SO$_2$OH group. The conversion of benzene (C$_6$H$_6$) into benzene-sulfonic acid (C$_6$H$_5$SO$_2$OH) is an example. Common sulfonating agents are: concentrated sulfuric acid, fuming sulfuric acid, sulfur trioxide, alkali disulfates, pyrosulfates, chlorosulfonic acid, mixtures of manganese dioxide and sulfurous acid and mixtures of sulfur trioxide and sulfur dioxide. The sulfonic acid product is neutralized, at least partially, to produce the desired sulfonate.

By way of specific example, a suitable petroleum sulfonate can be prepared by treating a feed oil having the composition set forth in Table I below:

TABLE I

| Feed Oil | |
|---|---|
| Test Procedure | Value Observed |
| Refractive Index @ 70C | 1.4574 |
| Gravity @ 60F API | 32.8 |
| Sp. Gr. @ 60F | 0.8612 |
| Viscosity @ 210F | |
| CS | 4.11 |
| SUS | 39.8 |
| Viscosity Index | 100 |
| Molecular Weight (ASTM 2502) | 367 |
| Constituent Analysis (ASTM D-3238-74) | 7.03 $C_A$ |
| | 31.78 $C_R$ |
| | 24.84 $C_N$ |
| | 68.13 $C_P$ |
| | 0.29 $R_A$ |
| | 1.59 $R_T$ |
| | 1.30 $R_N$ |

The feed is reacted with a mixture of SO$_2$ and SO$_3$ at a pressure high enough to keep the reactants in the liquid phase. The SO$_2$ is then removed by lowering the pressure and increasing the temperature. The acid products are then neutralized with ammonia, sodium hydroxide or the like. The sulfonate product is extracted from unreacted oil with isopropyl alcohol and water. The alcohol and water are then boiled off. Typical conditions of operation and analysis of the product are set forth in Table II. The average equivalent weight was determined as set forth previously.

TABLE II

| Operational Parameters | |
|---|---|
| Oil Feed Rate | 1993 ml/hour |
| SO$_3$ to Oil Ratio | 0.073 |
| SO$_3$ to SO$_2$ Ratio | 10.0 |
| Recovery Procedure | |
| Neutralization with NH$_3$ was followed by extraction with | |
| Isopropyl alcohol and water to obtain sulfonate product | |
| % Yield of Sulfonate | 20.8 (based on oil feed) |
| Analysis of Sulfonate Product | |
| Sulfonate | 81.3% |
| Unsulfonated Oil | 10.4% |
| Volatiles | 7.1% |
| Equivalent Weight of Sulfonate | 421 |

The AEW of the sulfonate can be adjusted by varying the feed oil ratios or the reactor conditions. Other parameters which can be adjusted to vary the AEW and quality of the sulfonate are fractionation, solvent extraction of the feed oils, the isopropyl alcohol-H$_2$O extraction of the sulfonate and the neutralization agent and conditions.

The surfactant is used in the mixture, in accordance with the present invention, in an amount within the range of about 1 to 7, preferably 2 to 5 weight percent active ingredient based on the weight of the water.

The water plus inorganic salt constituents comprise about 85 percent or more of the total mixture. Suitable inorganic salts include sodium sulfate, sodium nitrate, sodium chloride, sodium tripolyphosphate (Na$_5$P$_3$O$_{10}$), sodium carbonate, etc., but the nonmetallic, monovalent metallic salts, particularly sodium chloride, are preferred. Preferably, inorganic salts are present in water in an amount within the range of about 250 to about 100,000, more preferably 500 to 40,000, most preferably 5,000 to 25,000 parts per million total dissolved solids (TDS). Other electrolytes which may be present in combination with the sodium chloride include potassium chloride, calcium chloride, magnesium chloride, sodium sulfate, ammonium chloride, and the like. Large amounts of polyvalent, in particular divalent ions, are undesirable. If divalent ions are present in relatively large amounts, surfactants which are particularly suited for high tolerance to polyvalent ions may be used.

As previously indicated the use of a cosurfactant in the mixture is optional but is preferred. The cosurfactant may be any alcohol, amine, ester, aldehyde or ketone containing about 1 to about 20 carbon atoms and preferably having a solubility in water within the range of about 0.5 to 20, more preferably 2 to 10 grams per hundred grams of water at 20° C. Preferred materials are $C_4$ to $C_7$ alkanols or mixtures thereof. Most preferred are $C_4$ and $C_5$ alcohols having a solubility within the above range. Other preferred cosufactants include secondary butyl alcohol, n-butyl, n-amyl, and isoamyl alcohol. When used, the cosurfactant is utilized in amounts within the range of about 1 to 7, preferably 1.5 to 4 weight percent based on the weight of surfactant system. In general, any combination of surfactants and cosurfactants which meet the criteria previously described may be utilized in the mixtures.

As utilized in the present application, the following terms are meant to have the meanings set forth below.

"Oil" shall mean a reservoir oil in its in-place condition, a pure hydrocarbon, a reservoir oil under atmospheric conditions or a simulated oil, comprising a reservoir oil initially under atmospheric conditions but modified to produce a gas saturation equivalent to the gas saturation of in-place oil or a pure hydrocarbon or mixture modified to produce a gas saturation equivalent to the gas saturation of in-place oil.

"Surfactant System" shall mean a system comprising water, an electrolyte, a surfactant and, optionally, a cosurfactant.

"Equivalent Alkane Carbon Number" or "EACN" shall mean the number assigned to an oil, comprising a complex mixture of hydrocarbons, which is equal to the alkane carbon number of a pure hydrocarbon or mixture which exhibits substantially the same phase relationship, when equilibrated with a surfactant system, as is exhibited by said oil, when equilibrated with the same surfactant system.

"Optimum Salinity" or "Optimal Salinity" shall mean that salinity of a surfactant system which, when equilibrated with an equal volume of an oil or pure hydrocarbon, results in the uptake in the microemulsion phase of a three-phase region, comprising an oil phase, a microemulsion phase and a water phase, of substantially equal volumes of oil and water or, alternatively, results in substantially equal volumes of water phase below said microemulsion phase and oil phase above said microemulsion phase in said three-phase region.

"Unique Salinity" shall mean that optimal salinity of a surfactant system which results in the maximum oil displacement of a given oil from a porous media.

"Optimum Solubility" or "Optimal Solubility" of a cosurfactant shall mean that water solubility of a cosurfactant, included in a surfactant system of optimal salinity, at which said surfactant system displaces a maximum volume of oil from a porous media.

While specific materials, procedures and examples are given herein it is to be understood that these are illustrative only and are not to be considered limiting.

We claim:

1. A method for determining the average equivalent weight of a hydrocarbon sulfonate of unknown average equivalent weight, comprising:
   (a) establishing one of (1) the optimal salinities or (2) the unique salinities of at least two surfactant systems containing hydrocarbon sulfonates of different, known average equivalent weights;
   (b) establishing one of (1) the optimal salinity or (2) the unique salinity of a surfactant system containing said hydrocarbon sulfonate of unknown average equivalent weight; and
   (c) assigning an average equivalent weight to said hydrocarbon sulfonate of unknown based on the relationship that the average equivalent weights of hydrocarbon sulfonates vary inversely and linearly as the optimal salinities or the unique salinities, respectively, of surfactant systems containing said hydrocarbon sulfonates vary.

2. A method in accordance with claim 1 wherein the established optimal salinities or unique salinities, respectively, of the surfactant systems containing the hydrocarbon sulfonates of different, known average equivalent weights are plotted as a linear function of said known average equivalent weights; the optimal salinity or the unique salinity, respectively, of the hydrocarbon sulfonate of unknown average equivalent weight is determined; and an average equivalent weight corresponding to the point on said function at which the optimal salinity or the unique salinity, respectively, determined for said hydrocarbon sulfonate of unknown average equivalent weight is located is assigned to said hydrocarbon sulfonate of unknown average equivalent weight.

3. A method in accordance with claim 1 wherein the optimal salinity or the unique salinity, respectively, of a surfactant system containing the hydrocarbon sulfonate of unknown average equivalent weight is determined and an average equivalent weight is assigned to said hydrocarbon sulfonate of unknown average equivalent weight by intercalation based on the optimal salinities or unique salinities, respectively, established for the hydrocarbon sulfonates of known average equivalent weights and said known average equivalent weights thereof.

4. A method in accordance with claim 1 wherein the optimal salinities are established for the surfactant systems containing the hydrocarbon sulfonates of known average equivalent weights and an average equivalent weight is assigned to the hydrocarbon sulfonate of unknown equivalent weight based on the relationship that the average equivalent weights of hydrocarbon sulfonates vary inversely and linearly as the optimal salinities of surfactant systems containing said hydrocarbon sulfonates vary.

5. A method in accordance with claim 1 wherein the surfactant systems containing the hydrocarbon sulfonates of known and unknown average equivalent weights also contain a cosurfactant which is at least slightly soluble in water, the unique salinities of said surfactant systems containing said hydrocarbon sulfonates of known average equivalent weight and said cosurfactant is established, and an average equivalent weight is assigned to the hydrocarbon sulfonate of unknown equivalent weight based on the relationship that the average equivalent weights of hydrocarbon sulfonates vary inversely and linearly as the unique salinities of surfactant systems containing said hydrocarbon sulfonates and a cosurfactant vary.

6. A method in accordance with claim 5 wherein the cosurfactant is an alcohol.

7. A method for determining one of (1) the optimal salinity or (2) the unique salinity of a surfactant system of unknown optimal salinity or unique salinity, respectively, comprising:
  (a) establishing the average equivalent weights of at least two hydrocarbon sulfonates contained in an equal number of surfactant systems of known optimal salinities or unique salinities, respectively;
  (b) establishing the average equivalent weight of a hydrocarbon sulfonate contained in a surfactant system of unknown optimal salinity or unique salinity, respectively; and
  (c) assigning an optimal salinity or unique salinity, respectively, to said surfactant system of unknown optimal salinity or unique salinity, respectively, based on the relationship that the optimal salinities, or the unique salinities, respectively, of surfactant systems vary inversely and linearly as the average equivalent weights of said hydrocarbon sulfonates vary.

8. A method in accordance with claim 7 wherein the established average equivalent weights of the hydrocarbon sulfonates contained in the surfactant systems of known optimal salinities or unique salinities, respectively, are plotted as a linear function of said known optimal salinities or unique salinities, respectively; the average equivalent weight of the hydrocarbon sulfonate contained in the surfactant system of unknown optimal salinity or unique salinity, respectively, is determined; and an optimal salinity or a unique salinity, respectively, corresponding to the point on said function at which the average equivalent weight determined for said hydrocarbon sulfonate contained in said surfactant system of unknown optimal salinity or unique salinity, respectively, is located, is assigned to said surfactant system of unknown optimal salinity or unique salinity, respectively.

9. A method in accordance with claim 7 wherein the average equivalent weight of the hydrocarbon sulfonate contained in the surfactant system of unknown optimal salinity or unique salinity, respectively, is determined and an optimal salinity or a unique salinity, respectively, is assigned to said surfactant system of unknown optimal salinity or unique salinity, respectively, by intercalation based on the average equivalent weights established for the hydrocarbon sulfonates contained in the surfactant systems of known optimal salinities or unique salinities, respectively, and said known optimal salinities or unique salinities, respectively, thereof.

10. A method in accordance with claim 7 wherein the average equivalent weights of the hydrocarbon sulfonates contained in the surfactant systems of known optimal salinities are established and an optimal salinity is assigned to the surfactant system of unknown optimal salinity based on the relationship that the optimal salinities of surfactant systems vary inversely and linearly as the average equivalent weights of the hydrocarbon sulfonates contained in said surfactant systems vary.

11. A method in accordance with claim 7 wherein the surfactant systems of known and unknown unique salinities also contain a cosurfactant which is at least slightly soluble in water, the average equivalent weights of the hydrocarbon sulfonates contained in said surfactant systems of known unique salinities are established and a unique salinity is assigned to the surfactant system of unknown unique salinity based on the relationship that the unique salinities of surfactant systems vary inversely and linearly as the average equivalent weights of hydrocarbon sulfonates contained in said surfactant systems vary.

12. A method in accordance with claim 11 wherein the cosurfactant is an alcohol.

13. A method of preparing an oil-displacing surfactant system having one of (1) a predetermined optimal salinity, or (2) a predetermined unique salinity and containing a hydrocarbon sulfonate, comprising:
  (a) establishing the optimal salinities or the unique salinities, respectively, of at least two surfactant systems containing hydrocarbon sulfonates of different, known average equivalent weights;
  (b) assigning an average equivalent weight to a hydrocarbon sulfonate of unknown average equivalent weight which is included in said surfactant system having said predetermined optimal salinity or said predetermined unique salinity, respectively, based on the relationship that the average equivalent weights of hydrocarbon sulfonates vary inversely and linearly as the optimal salinity or the unique salinity, respectively, of surfactant systems containing said hydrocarbon sulfonates vary;
  (c) preparing a surfactant system having a salinity substantially equal to said predetermined optimal salinity or said predetermined unique salinity, respectively, and containing a hydrocarbon sulfonate having an average equivalent weight substantially equal to the average equivalent weight assigned to said hydrocarbon sulfonate of unknown equivalent weight.

14. A method in accordance with claim 13 wherein the hydrocarbon sulfonate having an average equivalent weight substantially equal to the average equivalent weight assigned to the hydrocarbon sulfonate of unknown average equivalent weight is prepared by blending hydrocarbon sulfonates having different average equivalent weights.

15. A method in accordance with claim 13 wherein the hydrocarbon sulfonate having an average equivalent weight substantially equal to the average equivalent weight assigned to the hydrocarbon sulfonate of unknown average equivalent weight is prepared by forming a plurality of blends of hydrocarbon sulfonates having different average equivalent weights until a blend having said average equivalent weight substantially equal to said average equivalent weight assigned to the hydrocarbon sulfonate contained in the surfactant system of predetermined optimal salinity or predetermined unique salinity, respectively, is obtained.

16. A method in accordance with claim 13 wherein the optimal salinity or the unique salinity, respectively, for a surfactant system containing each of the blends of hydrocarbon sulfonates is determined and an average equivalent weight is assigned to each of said blends of hydrocarbon sulfonates based on the relationship that the average equivalent weights of hydrocarbon sulfonates vary inversely and linearly as the optimal salinities or the unique salinities, respectively, of surfactant systems containing said hydrocarbon sulfonates vary, until a blend of hydrocarbon sulfonates is obtained having an assigned average equivalent weight substantially equal to the average equivalent weight assigned to the hydrocarbon sulfonate of unknown average equivalent weight is obtained.

17. A method in accordance with claim 13 wherein the hydrocarbon sulfonate having an average equivalent weight substantially equal to the average equivalent weight assigned to the hydrocarbon sulfonate of unknown average equivalent weight is manufactured by sulfonation of a hydrocarbon feed and at least partial neutralization of the resultant sulfonic acid.

18. A method in accordance with claim 17 wherein the hydrocarbon sulfonate having an average equivalent weight substantially equal to the average equivalent weight assigned to the hydrocarbon sulfonate of unknown average equivalent weight is prepared by manufacturing a plurality of hydrocarbon sulfonates by changing at least one of (1) the nature of at least one of the feed materials, (2) the proportions of said feed materials, (3) at least one of the conditions of operation of the sulfonation steps or (4) the neutralizing agent of the manufacturing process until a hydrocarbon sulfonate having said average equivalent weight substantially equal to said average equivalent weight assigned to the hydrocarbon sulfonate of unknown average equivalent weight is obtained.

19. A method in accordance with claim 17 wherein the optimal salinity or the unique salinity, respectively, for a surfactant system containing each of the manufactured hydrocarbon sulfonates is determined and an average equivalent weight is assigned to each of said manufactured hydrocarbon sulfonates based on the relationship that the average equivalent weights of hydrocarbon sulfonates vary as the optimal salinities or unique salinities, respectively, of surfactant systems containing said hydrocarbon sulfonates vary, until a manufactured hydrocarbon sulfonate is obtained having an assigned average equivalent weight substantially equal to the average equivalent weight assigned to the hydrocarbon sulfonate of unknown average equivalent weight is obtained.

20. A method of preparing an oil displacing surfactant system containing a hydrocarbon sulfonate of predetermined average equivalent weight, comprising:
  (a) establishing the average equivalent weight of at least two hydrocarbon sulfonates contained in surfactant systems having one of (1) a known optimal salinities or (2) a known unique salinities;
  (b) assigning an optimal or unique salinity, respectively, to a surfactant system of unknown optimal or unique salinity containing said hydrocarbon sulfonate of predetermined average equivalent weight based on the relationship that the optimal salinities or the unique salinities, respectively, of surfactant systems containing hydrocarbon sulfonates vary inversely and linearly as the average equivalent weights of said hydrocarbon sulfonates vary; and
  (c) preparing said surfactant system containing a hydrocarbon sulfonate having an average equivalent weight substantially equal to said predetermined average equivalent weight and having a salinity substantially equal to said optimal salinity or said unique salinity, respectively, assigned to said surfactant system of unknown optimal or unique salinity.

21. A method in accordance with claim 20 wherein the hydrocarbon sulfonate having an average equivalent weight substantially equal to the predetermined average equivalent weight is produced by blending hydrocarbon sulfonates having different average equivalent weights.

22. A method in accordance with claim 21 wherein the hydrocarbon sulfonate having an average equivalent weight substantially equal to the predetermined average equivalent weight is produced by forming a plurality of blends of hydrocarbon sulfonates having different average equivalent weights until a blend having an average equivalent weight substantially equal to the predetermined average equivalent weight is obtained.

23. A method in accordance with claim 22 wherein the optimal salinity or the unique salinity, respectively, for a surfactant system containing each of the blends of hydrocarbon sulfonates is determined and an average equivalent weight is assigned to each of said blends of hydrocarbon sulfonates based on the relationship that the average equivalent weights of hydrocarbon sulfonates vary inversely and linearly as the optimal salinities or the unique salinities, respectively, of surfactant systems containing said hydrocarbon sulfonates vary, until a blend of hydrocarbon sulfonates is obtained having an assigned average equivalent weight substantially equal to the predetermined average equivalent weight is obtained.

24. A method in accordance with claim 20 wherein the hydrocarbon sulfonate having an average equivalent weight substantially equal to the predetermined average equivalent weight is manufactured by sulfonation of a hydrocarbon feed and at least partial neutralization of the resultant sulfonic acid.

25. A method in accordance with claim 24 wherein the hydrocarbon sulfonate having an average equivalent weight substantially equal to the predetermined average equivalent weight is prepared by manufacturing a plurality of hydrocarbon sulfonates by changing at least one of (1) the nature of at least one of the feed materials, (2) the proportions of said feed materials, (3) at least one of the conditions of operation of the process of manufacture or (4) the neutralizing agent of the manufacturing process until a hydrocarbon sulfonate having said average equivalent weight substantially equal to the predetermined average equivalent weight is obtained.

26. A method in accordance with claim 25 wherein the optimal salinity or the unique salinity, respectively, for a surfactant system containing each of the manufactured hydrocarbon sulfonates is determined and an average equivalent weight is assigned to each of said manufactured hydrocarbon sulfonates, based on the relationship that the average equivalent weights of hydrocarbon sulfonates vary inversely and linearly as the optimal salinities or the unique salinities, respectively, of surfactant systems containing said hydrocarbon sulfonates vary, until a manufactured hydrocarbon sulfonate having an assigned average equivalent weight substantially equal to the predetermined average equivalent weight is obtained.

27. A method of displacing oil from a subterranian reservoir with a surfactant system having one of (1) a predetermined optimal salinity or (2) a predetermined unique salinity and containing a hydrocarbon sulfonate, comprising:
  (a) establishing the optimal salinities or the unique salinities, respectively, of at least two surfactant systems containing hydrocarbon sulfonates of different, known average equivalent weights;

(b) assigning an average equivalent weight to said hydrocarbon sulfonate of unknown average equivalent weight which is included in said surfactant system having said predetermined optimal salinity or unique salinity, respectively, based on the relationship that the average equivalent weights of hydrocarbon sulfonates vary inversely and linearly as the optimal salinity or the unique salinity, respectively, of surfactant systems containing said hydrocarbon sulfonates vary;

(c) preparing a surfactant system having a salinity substantially equal to said predetermined optimal salinity or said predetermined unique salinity, respectively, and containing a hydrocarbon sulfonate having an average equivalent weight substantially equal to the average equivalent weight assigned to said hydrocarbon sulfonate of unknown average equivalent weight; and (d) injecting into and forcing through said reservoir said prepared surfactant system.

28. A method in accordance with claim 27 wherein the predetermined salinity of the surfactant system is the optimal salinity.

29. A method in accordance with claim 27 wherein the surfactant system contains a cosurfactant, which is at least slightly soluble in water, and the predetermined salinity of said surfactant system is the unique salinity.

30. A method in accordance with claim 29 wherein the unique salinity is selected to be substantially equal to or close to the salinity of the connate water contained in the subterranean reservoir.

31. A method of displacing oil from a subterranian reservoir with a surfactant system containing a hydrocarbon sulfonate of predetermined average equivalent weight, comprising:

(a) establishing the average equivalent weights of at least two hydrocarbon sulfonates contained in surfactant systems having one of (1) a known optimal salinities or (2) a known unique salinities;

(b) assigning an optimal salinity or a unique salinity, respectively, to a surfactant system of unknown optimal or unique salinity, respectively, containing said hydrocarbon sulfonate of predetermined average equivalent weight based on the relationship that the optimal salinities or the unique salinities, respectively, of surfactant systems containing hydrocarbon sulfonates vary inversely and linearly as the average equivalent weights of said hydrocarbon sulfonates vary;

(c) preparing a surfactant system containing a hydrocarbon sulfonate having an average equivalent weight substantially equal to said predetermined average equivalent weight and having a salinity substantially equal to said optimal salinity or said unique salinity, respectively, assigned to said surfactant system of unknown optimal or unique salinity; and (d) injecting into and forcing through said reservoir said prepared surfactant system.

32. A method in accordance with claim 31 wherein the salinity of the prepared surfactant system is substantially equal to the optimal salinity assigned to the surfactant system containing the hydrocarbon sulfonate of predetermined average equivalent weight.

33. A method in accordance with claim 31 wherein the prepared surfactant system contains a cosurfactant, which is at least slightly soluble in water, and the salinity of said prepared surfactant system is substantially equal to the unique salinity assigned to the surfactant system containing the hydrocarbon sulfonate of predetermined average equivalent weight.

34. A method in accordance with claim 33 wherein the unique salinity is substantially equal to or close to the salinity of the connate water present in the subterranean reservoir.

* * * * *